United States Patent [19]

Schowe, Jr.

[11] 3,938,082

[45] Feb. 10, 1976

[54] RECEIVER FOR BI-POLAR CODED DATA WITH BIT TIME INTERVAL DETECTION USED AS THE DATA VALIDATION DISCRIMINANT

[75] Inventor: Lester F. Schowe, Jr., Endwell, N.Y.

[73] Assignee: General Electric Company, Binghamton, N.Y.

[22] Filed: Sept. 19, 1974

[21] Appl. No.: 507,503

[52] U.S. Cl. .................. 340/146.1 D; 178/69.5 R; 340/146.1 AB
[51] Int. Cl.[2] ................ G08C 25/00; H03K 5/18; H04B 17/00; H04L 1/00
[58] Field of Search............ 178/69.5 R; 325/41, 42; 340/146.1 AB, 146.1 D, 146.1 R

[56] References Cited
UNITED STATES PATENTS
3,838,214   9/1974   Lind................................ 178/69.5 R Primary Examiner—R. Stephen Dildine, Jr.
Attorney, Agent, or Firm—I. David Blumenfeld

[57] ABSTRACT

A Split Phase Bi-polar Date Receiver is contemplated which uses an Interval Detector to measure the time interval between excursions of the bi-polar signal away from zero. This time interval or bit period is compared to predetermined intervals associated with different types of received bits, i.e., data, synch, etc. A Synchronizing Pulse Counter is provided to enable the receiver only if a specific number of synch pulses have been received indicating that a valid message is following. The enabling signal conditions a Data Clocking Path and allows the data bits to be accepted by, stored-in, and read-out of the Receiver Data Register. If the incoming data bits are of the proper duration, the Time Interval Detector produces an output data pulse which together with the enabling signal from the Synchronization Counter allows the data bits to be entered into the Register. If, on the other hand, the time interval is not correct due to transmission errors which can result in lost pulses, or the introduction of extraneous noise pulses, the Time Interval Detector generates an Error Pulse which disables the Data Clocking Path and receipt and entry of data into the Receiver Data Register is terminated while a Data Invalid Output signal is generated.

6 Claims, 15 Drawing Figures

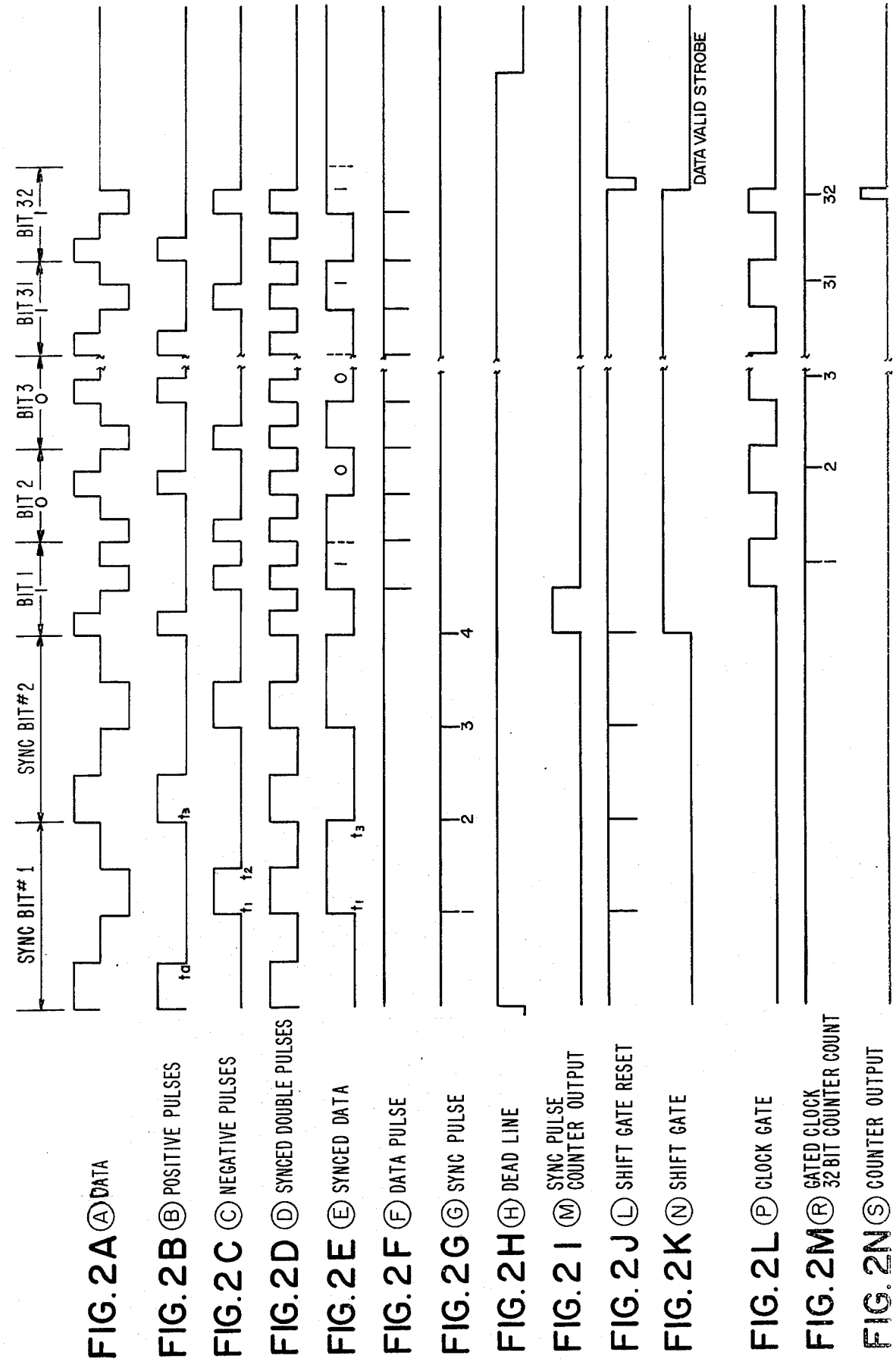

RECEIVER FOR BI-POLAR CODED DATA WITH BIT TIME INTERVAL DETECTION USED AS THE DATA VALIDATION DISCRIMINANT

The instant invention relates to digital data receiving system and more particularly, one which detects the presence of the transmitted pulse by measuring the time interval or period between receiving pulses rather than the pulse width, per se, so that the presence of a pulse within the time period is an accurate indication of the receipt of the pulse.

The transmission of coded data from a transmitter to various electronic systems on an aircraft, for example, presents many formidable problems. The data must often be transmitted over many miles of cable or wire. In order to reduce the weight, cost and Electromagnetic Interference (EMI) often associated with data transmission systems, special coding techniques have been devised in which data, synchronizing and clock signals are combined and transmitted over a single wire. In addition, the wave shape of the transmitted pulses are often modified to reduce EMI by avoiding the transmission of pulses, such as rectangular pulses, which have very short rise and fall times. However, by modifying the rise and fall times of the data pulses, serious difficulties may arise in recovering the data at the receiving end, particularly if the data pulse rise and fall times vary widely due to load and transmission characteristics. Hitherto, data receivers have relied heavily on using the pulse width of the received signal as the discriminant for sensing, processing and decoding. The sensing of pulse width to recover the received data involves many difficulties. These difficulties are primarily related to the varying rise and fall times of the received pulses. If the rise and fall times vary widely, the detected pulse width can also vary widely since width detection techniques rely heavily on sensing a threshold or "detect" level of the pulse. As a result, the receiver can malfunction or provide erroneous data indications under certain transmitter loading conditions because the detected pulse width is not within specified limits even though the signal, as a whole, is within specified limits. Furthermore, receivers of this type usually cannot detect invalid or incorrect data resulting from transmission problems such as noise spikes or pulses. Consequently, incorrect data can be and is sent to the computer or other data utilization circuit.

Applicant has discovered that virtually all of these difficulties may be avoided and the data received, processed and decoded with great accuracy by detecting the period of the transmitted data bit rather than the data bit pulse width. The use of period, instead of a pulse width, as a processing discriminant, makes the receiver independent of the rise and fall times associated with the incoming data signal. That is, for any succeeding pair of data bits, the period between the leading edge of a pulse of one data bit and the leading edge of a pulse of the next data bit remaining constant even if the rise and fall times are quite variable. If the pulse width increases, for example, the interval between the end of the pulse and the beginning of the next pulse decreases. The period thus stays constant even though the pulse width has changed. Obviously, then if the pulse width is the measuring discriminant, the system is subject to measuring errors resulting from the pulse width variations.

It is, therefore, a principal objective of this invention to provide a receiver for digital data in which the receiver's ability to detect and decode the data is independent of the rise and fall times of the incoming signal.

Another objective of the invention is to provide a receiver for digital data in which the period of the incoming digital data bits is utilized as the processing discriminant.

Other objectives and advantages of the invention will become apparent as the description thereof proceeds.

The various objectives and advantages of the invention are realized in a receiver in which digital data in a Split Phase Bi-polar (SPBP) format is received and processed.

Bi-polar data is data in which each bit is represented by two successive pulses of opposite polarity. Thus, a logic "1" bit is represented by a positive pulse relative to ground followed by a negative pulse. A logic "0" bit, on the other hand, is represented by a negative pulse followed by a positive pulse. The duration or interval of the bi-polar bits is utilized to distinguish synchronizing bits from data bits.

If the proper number of synchronizing bits is received, an enabling signal is generated which conditions a Data Clocking Path so that it is capable of clocking the received data into a receiver Data Storage Register. The received bits are also processed in a Bit Time Interval Detector Path in which the time interval between successive bits (whether the full bit time for two pulses or a half bit time for one pules), i.e., departures from zero, is measured. Since the interval between succeeding bits is measured, it is obvious that the bit period which is constant is being measured. The time Interval Detector Logic puts out a Data Pulse if the time interval or period is correct for a data bit, a synch pulse if the time interval or period is correct for a synchronizing bit, and Error pulse if the time interval is other than that for a data or synchronizing bit, and a Dead Line Pulse if the time interval exceeds a predetermined value indicating the receiving line or transmission medium has gone dead. The Data Pulses from the Interval Logic are applied to the Data Clocking Path and clock data into the Receiver Data Storage Register.

The Synchronizing, Error, and Dead Line pulses from the Interval Timer Logic are utilized to disable the Data Clocking Path and stop further data storage if any of these pulses are generated after clocking of data into the register has been initiated but not finished. That is, once the Data Clocking Path has been conditioned by the enabling signal generated by the receipt of the proper synchronizing bit sequence, the receipt of any bit other than a data bit, indicates a data error and causes the Time Interval Detecting Logic Output to be either an Error, a Synch Present or a Dead Line Signal. These signals disable the Data Clocking Path terminating data transmission to the Receiver Storage Register, resetting all of the logic networks and generating a Data Invalid signal. it will be appreciated that by measuring time interval or period, data errors occurring both at the transmitting end and during transmission will readily be detected. For example, the loss of a bit pulse either in transmission or at the transmitter itself or the introduction of a noise spike changes the time interval sensed by the Time Interval Logic and produces an error signal which disables the Data Clocking Path and prevents erroneous data from being entered into the Register, while at the same time, producing a Data Invalid indication. The system, therefore, provides a simple and unique arrangement which inherently detects any transmission errors by utilizing the bit period as the processing discriminant.

The novel features which are characteristic of this invention are set forth with particularity in the appended claims. The invention itself, both as to its organization and method of operation, together with further objectives and advantages, may best be understood by reference to the following description taken in connection with the accompanying drawings in which:

FIGS. 2A –2N are timing diagrams depicting wave forms in various parts of the receiver of FIG. 1.

Figure 1:
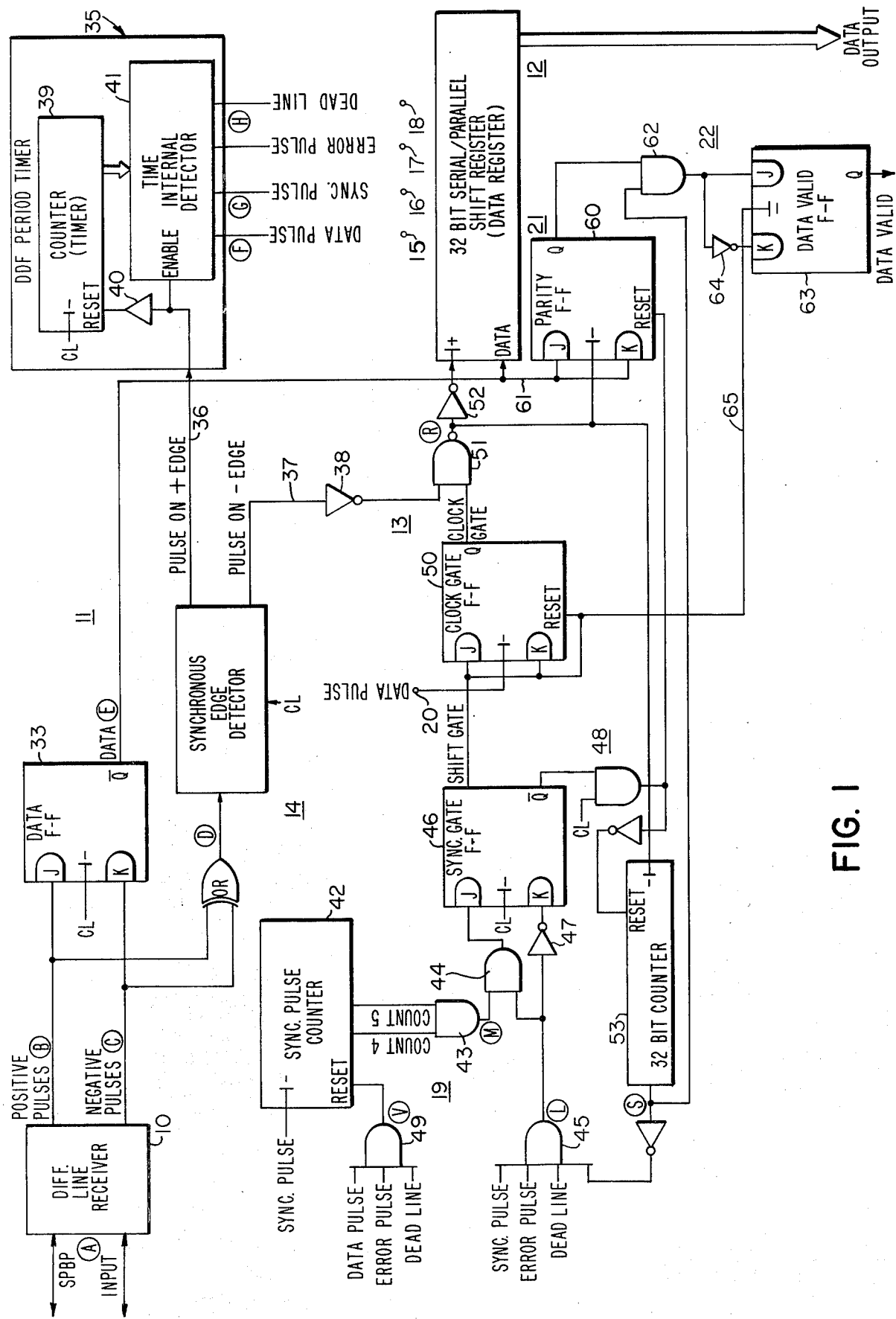
FIG. 1 is a block diagram of a receiver embodying the instant invention.

The receiver illustrated in FIG. 1, as pointed out previously, senses the time interval or period between succeeding received bits or half bits to determine the validity of the received data. By sensing the period and determining whether it meets predetermined acceptable criteria unique to the synchronizing and data bits, any sequence errors or addition of noise spikes or noise pulses, are readily detected since they change the time interval between bits. If there has been a sequence error, storage of the invalid data in the Receiver Register is stopped and a Data Invalid Signal is generated. If there have been no sequence errors and if the proper parity, in this case odd, has been detected, the data is stored in the Receiver Register and a Data Valid Signal is generated.

The input data to and the particular embodiment of the receiver for decoding the data is designed for a Split Phase Bipolar (SPBP) code. It will be appreciated, however, as the description of the invention proceeds, that the invention is not limited thereto and is applicable to other code forms.

The input data, as shown in FIG. 2A, is in the form of a 32 bit word preceded by 2 synchronizing bits all in the Split Phase, Bi-polar format. The input data is coupled to a Differential Line Receiver 10 which consists of two comparators which separate the positive and negative pulses of the bi-polar input signal and produces two positive pulse trains as shown in FIGS. 2B and 2C, representative respectively of the positive and negative pulses of each synchronizing and data bit. The incoming signal in this modified form is applied to a Data Conversion Path 11 in which the bi-polar data is converted to standard digital format for entry in the Receiver Data Register 12 through a Data Clocking Path shown generally at 13.

The pulse trains from Differential Line Receiver 10 are also applied to a bit time Interval Detector Path 14 in which the interval between succeeding pulses, (i.e., the interval between half bits of the bi-polar code shown in FIG. 2A) is measured to determine whether a data bit, or a synchronizing bit has been received or whether an error condition or a dead line (i.e., data transmission has been lost) condition exists. That is, if the measured time interval falls within a predetermined value associated with a data bit, a Data Pulse is generated. If the time interval falls within the range of values associated with a synchronizing bit a Synchronizing Pulse is generated. If the time interval is other than the values associated with a data bit, a synchronizing bit, an Error or Dead Line Pulse is generated depending on the interval value. The Data, Synchronizing, Error and Dead Line Pulses are generated at output terminals 15-18 of Interval Timer Path 14.

The synchronizing pulses from bit Interval Detector Path 14 appearing at terminal 16 are applied to a Synchronizing Pulse Counter Network 19 which generates an enabling pulse for Data Clocking Path 13 if the proper number of synchronizing Pulses have been received indicating that a valid message is following. The enabling pulse conditions the Data Clocking Path so that the Data Pulses from the Interval Timer can clock data from Data Conversion Path 11 into Receiver Data Register 12. If no enabling signal is generated in Synchronizing Pulse Counter Network 19, Data Clocking Path 13 is disabled and no data is clocked into Register 12 ensuring that no data is entered into the Register unless the proper sequency of Sychronizing bits at the beginning of the transmission indicates a valid message.

Data pulses at output terminal 15 of Interval or Period Timer path 14 are, in a manner presently to be described, applied to an input terminal 20 in Data Clocking Path 13 and used to clock data into the Data Register. The Data, Synchronizing, Error and Dead Line pulses from Interval Timer Path 14 are also applied as reset signals to Synchronizing Pulse Network 19 to reset that network if a synchronizing, error dead line pulse is generated after clocking of data into Data Register has begun. That is, with input data in the form of 2 synchronizing bits and 32 data bits, the Data Clocking Path is enabled by the synchronizing bits and then the Bit Interval Timer Path should generate 64 successive data pulses (i.e., one pulse for each half data but time interval in a bi-polar code) if a valid 32 data unit message follows. Hence, if an Error, Synchronizing or Dead Line pulse is produced after the clocking path is enabled, this is a clear indication that a data bit has been lost or a noise spike has been inserted or some other transmission sequence error has occurred and the data is invalid. By resetting Synchronizing Pulse Network 19, Data Clocking Path 13 is disabled so that the erroneous or invalid data is not entered into the Receiver Data Register 12.

Data from Data Conversion Path 11 is also applied to a Parity Detection Network 21 which senses the parity of the input SPBP data. Parity Detector 21 produces one output if the proper parity, which in the system presently to be described is odd parity, is detected and a different output if the wrong, or even, parity is detected. The output from Parity Detecting Network 21 is applied along with a signal from a 32 bit counter in Data Clocking Path 13 to a Data Validation Circuit 22. Data Validation Circuit 22 produces a Data Valid Signal if the output pulse from Parity Network 21 indicates that the proper, i.e., odd parity has been detected and the output from the clocking path indicates that 32 consequetive data bits have been received. If either the parity is in error or the Data Clocking Path has been disabled because there has been transmission sequence error and a data bit has been lost, etc., a Data Invalid signal is generated to indicate this condition.

DATA CONVERSION PATH

Data Conversion Path 11 includes a J-K Flip-Flop 33. The pulses from Differential Line Receiver 10 which represent the positive pulses of the received bits are applied to the J terminal to set the flip-flop and the pulses representing the negative pulses from the split phase bi-polar (SPBP) data to the K terminal. Clock pulses from a 1 MHz clock pulse source, not shown, are applied to the clock input terminal and the data in a return to zero digital form is recovered at $\overline{Q}$ terminal.

The operation characteristic for a J-K flip-flop for various combinations of logic inputs is shown in the following Truth Table.

| J | K | $Q_{OUTPUT}$ | $\overline{Q}_{OUTPUT}$ |
|---|---|---|---|
| 0 | 0 | Q | $\overline{Q}$ |
| 0 | 1 | 0 | 1 |
| 1 | 0 | 1 | 0 |
| 1 | 1 | $\overline{Q}$ | Q |

The J, K columns show the logic state of the respective input terminals. The Q and $\overline{Q}$ columns show the states the Q and $\overline{Q}$ output terminals assume upon receipt of a clock pulse immediately after the J and K terminals have assumed the designated states. As the Q and $\overline{Q}$ terminals are always opposite their output states are always opposite for any given combination of inputs to the J-K terminals. Thus, with J and K both at logic "zero" states the Q and $\overline{Q}$ outputs remain in their prior states. With J at the logic "zero" and K at the logic "one" level the Q output goes to the logic "zero;" and $\overline{Q}$ goes to the logic "one" level with the next clock pulse. With J at logic "one" and K at K at logic "zero" Q goes to logic "one" and Q to logic "zero." With the J and K inputs both at logic "one" the Q and $\overline{Q}$ terminal simply reverse or "toggle" their former states with each clock pulse. If the output terminal was previously at logic "one" it goes to logic "zero" and if it was at logic "zero" it goes to logic "one."

The data output from flip-flop 30 is taken from the $\overline{Q}$ terminal and the digital data, as shown by the wave form of FIG. 2E, is coupled over an output lead to the data input terminal of a 32 bit serial to parallel shift register 31 which acts as the Receiver Data Register.

As may be seen in FIGS. 2B, from $t_0$ to $t_1$, the J terminal input, i.e., the positive pulses of the SPBP data of FIG. 2A, is at logic "zero." As shown in FIG. 2C, the K input, i.e., the negative pulses of the SPBP data of FIG. 2A, is also at logic "zero". Hence, the Q and $\overline{Q}$ outputs of Data Flip-flop 30, as shown in FIG. 2E remain in their previous states with Q terminal in the logic "one" state and $\overline{Q}$ in the logic "zero" state. The negative pulse output of differential receiver goes positive so that at $t_1$ the K terminal input (representing the negative pulses of the SPBP data of FIG. 2A) goes to the logic "one" state. The J input remains at the logic "zero" state. The next clock pulse switches the Flip-Flop in accordance with the "Truth Table" discussed previously and the Q output goes to "zero." The output at $\overline{Q}$ as shown in FIG. 2E, goes to the logic "one" state. At $t_2$, the input to the K terminal returns to the logic "zero" state and both the J and K inputs are now at logic "zero" stat so that the output of Flip-Flop 30 remain the same, i.e., the Q output remains at logic "zero" and the $\overline{Q}$ output at logic "one." At $t_3$ the input to the J terminal goes to the logic "one" state so that the J input to Data Conversion Flip-Flop 30 is now at logic "one" and the K input at logic "zero." According to the Truth Table for a J-K flip-flop the next clock pulse causes the Q terminal to go to a logic "one" state and the $\overline{Q}$ terminal goes to the logic "zero" state. It is obvious, therefore, that flip-flop 30 converts the incoming bi-polar bits to the conventional return to zero digital data format. Since, as pointed out previously, a logic "one" data bit in the bi-polar code is represented by a positive pulse followed by a negative pulse whereas a logic "zero" bit is represented by a negative pulse followed by a positive pulse, Flip-flop 30, as shown in FIG. 2E, convert each bit in the SPBP format to a digital data bit in which a positive pulse represents a "one" bit and ground represents "zero" data bit during the second half of the bit interval when data is clocked into the register.

BIT TIME INTERVAL DETECTOR PATH

Bit Time Interval Detector Path 14 includes an Exclusive OR circuit 33 which receives the pulse trains representing the positive and negative pulses of the SPBP data, as shown in FIGS. 2B and 2C, from Differential Receiver 10. Exclusive OR circuits are well-known devices which produce a positive output in response to a positive input at either one but not both of its input terminals. Exclusive OR circuit 33 therefore adds the two pulse trains to produce a pulse train having a pulse repetition frequency which is twice that of the individual pulse trains from Differential Line Receiver 10. This Derived Double Frequency (DDF) pulse train is shown in FIG. 2D. It can be seen from FIG. 2D that OR gate 33 produces an output pulse for each pulse in the pulse trains from Differential Line Receiver 10, shown in FIGS. 2B and 2C. The interval between successive pulses in the double frequency pulse (DDF) train thus represents a one-half of the data or synchronizing bit interval and this timing relationship is utilized subsequently to determine whether any given bit is a data or synchronizing bit. The DDF pulse train from OR gate 33 is applied as a clock signal to a Synchronous Edge Detector 34 which produces a short, 1 microsecond, for example, output pulse in response to each positive going pulse edge and a similar, short, 1 microsecond pulse in response to each negative pulse edge. Synchronous Edge Detector 34, may, for example, consist of a pair of monostable or "one-shot" multivibrators. One multivibrator is triggered by a positive-going pulse edge and the other one is triggered by the negative-going edge. The "one-shots" are triggered by the positive and negative edges of the DDF pulses and then return to their original states producing a short 1 microsecond pulse in response to each positive and negative going pulse edge from the DDF train. The pulse trains (representing the positive and negative-going edges) at the output of Edge Detector 34 are coupled over lead 36 to Half Bit Period Timer 35 and over lead 37 and inverting amplifier 38 to Receiver Clocking Path 13. The pulses representing the positive-going edges of the DDF pulses are applied to Timer 35 and are utilized to reset a shift register, to clock an interval timer and to measure the interval between successive positive-going pulses edges and consequently, the period between alternate half bits. Half Bit Period Timer 35 includes a series/parallel shift register 39 which is clocked from a source of one MHz clock pulses and is reset by the pulses from Edge Detector 34 which represent the positive going or leading pulse edges of the DDF pulses. The pulses are applied to the register resetting terminal through an inverting amplifier 40 to reset register 39 to the zero count. The output from shift register 39 is in the form of a plurality of parallel outputs, not shown, which are coupled to Time Interval Detector 41 which is also enabled by the positive pulses from Edge Detector 34.

As the cock pulses are shifted through Register 39, successive parallel output lines go high. The precise number of pulses shifted through and hence, the number of output lines which go high is determined by the interval between the reset pulses from Edge Detector 34. Shift Register 39 therefore shifts by an amount depending on the time interval between successive reset pulses. Since the interval between reset pulses represents the time interval between two successive positive going edges of the DDF pulse train which, in turn, represents one-half bit time, the output of register 39 is representative of the half bit period of the received signals.

Time Interval Detector 41 senses the shift register count and generates the data and synchronizing pulses. If the time interval represented by the count is consistent with the half bit or bit times for Data or Synchronizing bit, a Data or Synchronizing Pulse is produced at output lines 15 and 16. If the interval is not correct, an Error or Dead Line pulse is generated. Interval Detector 41 consists of a plurality of logic gates, not shown, which are connected to selected output lines from shift register 39. Each of the logic gates also have an input from the Synchronous Edge Detector so that there is an output from a particular logic gate only if the count in the serial register is such that the time interval falls within the predetermined interval associated with a particular bit for which that gate is set. For example, let it be assumed that for 32 bit word preceded by two synchronizing bits, as shown in FIG. 2A, the half-bit time interval T for the various bits is as follows:

| | |
|---|---|
| Data pulse: | 8 $\mu$s < T < 14 $\mu$s |
| Synch pulse: | 16 $\mu$s < T < 30 $\mu$s |
| Error pulse: | T < 8 $\mu$s or 14 $\mu$s < T < 16 $\mu$s |
| Dead Line pulse: | T > 30 $\mu$s |

Thus, for this combination of bit times, the logic gate for the data bit interval has one input from the edge detector, one input from the number 8 pulse (8$\mu$s) output line from shift register 39 and one input from an inverting amplifier connected to the number 14 pulse (14 $\mu$s) line. Thus, the inputs to this particular gate are all positive when a positive pulse from the Synchronous Edge Detector is present, i.e., the end of a period is being measured, the number 8 line from shift register 39 is positive, indicating that at least 8 clock pulses have been shifted down the register (i.e., at least an 8 microsecond interval has transpired) and the number 14 line has not yet gone high (i.e., indicating that less than 14 $\mu$seconds have transpired). Since the number 14 line coupled to the logic gate through an inverting amplifier, it can be seen that all three inputs to the logic gate are positive if the time interval has been greater than 8 microseconds and less than 14 microseconds at the time the Positive pulse from the Edge Detector enables the logic gate. As a result, data pulses, as shown in FIG. 2F, are produced on pulse line 15. If the interval is less, or greater, than the interval for the data bit, then all the inputs to that logic gate will not be positive and there is no data pulse at output line 15. Similarly, a synch pulse is produced at the associated logic gate only if the time interval criteria for T, as defined previously are met. Thus, a short, 1 microsecond pulse is outputted on one of three output lines 15, 16 and 17 after every positive going edge of one of the DDF pulses to indicate whether the previous half bit period was an Error, Data, or Synch pulse. Line 18 produces a Dead Line pulse in that, as shown in FIG. 2I, it goes to ground when 30 microseconds has elapsed since the last edge pulse and stays at ground until the next pulse.

The data pulses on line 15 are applied both to Synchronizing Pulse Counter Network 19 to reset the network after an enabling signal has been generated in response to the proper number of synchronizing bits and to enable the Data Clocking Path to transfer data from Data Conversion Path 11 into the Receiver Register. The Synchronizing pulses at output line 16 of Period Timer 35 are applied to a Synch Pulse Counter 42 in Synchronizing Pulse Counter Network 19 to set the counter and produce the enabling signal for Data Clocking Path 13, if four (4) synchronizing pulses representing two (2) bits have been received in succession. As has been pointed out previously, if the proper number of synchronizing bits precede the message (in this instance, two synchronizing bits and hence, 4 synchronizing pulses) it is an indication that a valid data message follows. Synchronizing Pulse Counter Network 19 counts the synchronizing pulses from line 16 and if four successive synch pulses are received as shown in FIG. 2G, an enabling signal as shown in FIG. 2I is provided which conditions Data Clocking Path 13 to clock data into the Register.

SYNCHRONIZING PULSE COUNTER NETWORK

Synchronizing Pulse Counter Network 19 includes Synch Pulse Counter 42 which may be a serial/parallel shift register. The output from synch pulse line 16 of Period Timer 35 is applied to the clock input terminal of the shift register. The output of Pulse Counter 42 is applied to AND gate 43 which has one input connected to the number 4 line of the shift register and the other input connected through an inverting amplifier, not shown, to the number 5 line. The Shift Register shifts the incoming synch signal serially through the register. Thus, if four successive synchronizing pulses are received from line 16, the number 4 output line of the register goes high. The number 5 line, on the other hand, is still down, because line 5 is coupled to Gate 43 by an inverting amplifier, not shown, the other input to the logic gate is also positive thereby producing a positive pulse, as shown in FIG. 2I after four synchronizing pulses. If only three synchronizing pulses are received, then the number 4 line is still down so that the output from AND gate 43 remains at ground. Similarly, if more than 4 synch pulses are received, the number 4 line will be positive but so will the number 5 line. As a result, the output to gate 43 from the inverting amplifier will be negative and gate 43 output remains at ground.

The output of AND gate 43 is applied as one input to gate 44, the other input of which comes from a reset AND gate 45 which has the $\overline{\text{Synch}}$, $\overline{\text{Error}}$ and $\overline{\text{Dead Line}}$ and End of Word pulses applied to its input. The inputs to AND gate 45 from $\overline{\text{Synch}}$, $\overline{\text{Error}}$ and $\overline{\text{Dead Line}}$ terminals 16–18 are high in the absence of an output pulse from lines 16–18. Thus, at the end of 4 synchronizing pulses, the output of reset gate 45 as shown in FIG. 2J, goes back to a logic "one" since all of the inputs to the AND gate are again high or logic "one."

The inputs to AND gate 44 are, therefore, positive after 4 synchronizing pulses producing a positive output pulse which is applied to the J gate of a Synch Gate Flip-Flop 46. The K input to Flip-Flop 46 is from reset gate 45, through an inverting amplifier 47. Thus, after 4 sequential synch pulses, the input to J terminal is at the logic "one" level and the input to the K terminal is at the logic "zero" level. The next clock pulse at the clock pulse terminal of Flip-Flop 46 therefore, drives the Q output of Flip-Flop 46 to the logic "one" level as shown in FIG. 2K, to produce the enabling signal which conditions Data Clocking Path 13 to shift data into register 12. The Q terminal of Flip-Flop 46 goes to the logic "zero" level and is applied through a Resetting Circuit 48, presently to be described, to a 32 bit counter in Data Clocking Path 13 to reset Flip-Flop 46 at the end of the 32 bit word.

Synchronizing Gate Flip-Flop 46 is reset by AND gate 45 whenever a Synch pulse, Error pulse or Dead Line pulse is received after initiation of data clocking into the register. That is, once the Synch Pulse Network has produced the enabling pulse for Data Clocking Path 13, the output of AND gate 45 is at a high or logic "one" level so that the Q output of Flip-Flop 46 is high. If, after initiation of data transfer, a Synch pulse, Error pulse, or Dead Line pulse appears at lines 16–18 before all 32 data bits have been shifted, one of the inputs to AND gate 45 goes from the logic "one" to the logic "zero" level and the output of the gate goes to logic "zero." As a result, the K terminal of Flip-Flop 46 goes to the logic "one" level because of inverting amplifier 47. The setting of the J-K terminals reverse and the J terminal goes to "zero" and the K terminal goes to "one." According to the J-K Truth Table the Q terminal of Flip-Flop 46 goes to logic "zero" level terminating the enabling signal.

Synch Pulse Counter Shift Register 42, on the other hand, is reset by AND gate 49, the inputs to which are the Data, Error and Dead Line pulses. The inputs to AND gate 49 are at the logic "one" or high level in the absence of Data, Error or Dead Line pulses. If, after 4 synch pulses have been received and the enabling signal generated, either Data, Error, or in some instances, Dead Line pulses are produced, the input to gate 49 goes to the logic "zero" or low level. The output of gate 49 momentarily goes to the logic "zero" level resetting Synch Pulse Counter 42 until the appearance of the next sequence of 4 synch pulses. Alternatively, if less than 4 consecutive synch pulses appear (i.e., an Error pulse intervenes), the output of gate 49 also resets the Synch Pulse Counter. It can be seen, therefore, that Synchronizing Pulse Counter Network 19 produces an enabling signal for Data Clocking Path 13 whenever 4 synch pulses in a row are received from Period Timer 35. This enabling signal is terminated if 32 data bits have been received and read into the Receiver Register or if Synch, Error or Dead Line pulses are generated by the Timer after data clocking has been initiated but before 32 valid bits have been received.

DATA CLOCKING PATH

Data Clocking Path 13 clocks data into the Receiver Data Register during the second half of each SPBP bit time, i.e., the second of the pulses generated for every SPBP bit is used to generate the data pulse which clocks the data bits into the register and this allows every other Negative Edge pulse from Synchronous Edge Detector 34 to clock the Data Register. To this end, the Data pulses from lead 15 of Time Interval Detector 41 are utilized as clock pulses for a Clock Gate Flip-Flop 50. Flip-Flop 50 has the enabling signal from Synch Gate Flip-Flop 46 of Synchronizing Pulse Counter Network 19 applied both to its J and K terminals. With both of the J and K terminals at the logic "one" level, the Q output of this Flip-Flop reverses state or "toggles" with every input clock pulse. As shown in FIG. 2F the first Data pulse from Period Timer 35 is generated at the end of the first half of the first SPBP data bit. Flip-Flop 50 is initially reset and its Q output is at logic "zero" so that Flip-Flop 50 is "toggled" to the logic "one" state during every odd numbered data pulse (1, 3, 5 generated during the second half of every bit time) and is "toggled" to the logic "zero" state during every even numbered data pulse (2, 4, etc. which are generated during the first half of every bit time).

The output of Clock Gate Flip-Flop 50, as shown in FIG. 2L thus goes positive during the second half of each bi-polar data bit. The output of Flip-Flop 50 is applied as one input to NAND gate 51 which receives the negative or trailing edge pulses from Synchronous Edge Detector 34 and inverting amplifier 38. NAND gate 51 produces a negative output only if the output from Flip-Flop 50 is high and a positive pulse is received from Synchronous Edge Detector 34 and inverting amplifiers 38. If the output of Flip-Flop 50 is low, as it is during the first half of each SPBP bit, gate 51 is blocked. Thus, the output of NAND gate 51 acts as a clocking or Data Strobing element. The negative pulse from NAND gate 51 is applied to inverting amplifier 52 which is connected to the clock terminal of 32 bit serial/parallel shift register 31. Thus, during the second half of each SPBP bit pulse derived from the negative going edge of the incoming data bits, Gate 51, generates a positive clock pulse shown in FIG. 2M for the Data Register which allows data from Data Conversion Path 11 to be shifted into the Register and stored. It can be seen that gate 51 produces a negative pulse only when the output at the Q terminal of Clock Gate Flip-Flop 50 is high or logic "one," which occurs during the second half of the SPBP bit time. This negative output clock pulse is applied to Inverting Amplifier 52 to Strobe Data Register 12.

The output of gate 51 is also applied as an input to a 32 bit Counter which resets Gate 45 in the Synchronizing Pulse Counter network to terminate the enabling signal for Clock Gate Flip-Flop 50 if the proper number of data bits have been received and the message is finished. Thus, if 32 consecutive correct data bits are received after the synchronizing bits have enabled the Data Clocking Path, a positive output signal is generated from Bit Counter 53. This pulse is applied to inverting amplifier 54 which produces a negative pulse which is applied to the input of gate 45 and drives the output of that Gate from the logic "one" to the logic "zero" level. This resets Synch Gate Flip-Flop 46 and terminates the enabling signal for Clock Gate Flip-Flop 50. The entire system is thus reset and ready to receive the next message.

PARITY DETECTING NETWORK

The Parity Detecting Network 21 includes a parity checking J-K Flip-Flop 60 having both its J and K terminals connected through line 61 to the Q output of Data Conversion Flip-Flop 30. The clock terminal of Parity Checking Flip-Flop 60 is connected to the output of logic gate 51 in the Data Clocking Path. Every time a logic "one" Data signal is received from Data Flip-Flop 30, both the J and K terminals of Flip-Flop 60 are at logic "one." The negative clock pulse from logic gate 51 simply reverses or "toggles" the Flip-Flop state each time a "one" data bit is shifted into the Data Register. The output of the Flip-Flop remains the same every time a logic "zero" is shifted in. Since Parity Flip-Flop 60 is originally reset to the logic "zero" state, a logic "one" at its output after the last data bit is shifted into the Register, indicates that the Flip-Flop output has been switched or "toggled" an odd number of times during the 32 bit word, i.e., that an odd number of logic "one" data bits have been entered into the Data Register which means that the signal has odd parity and is acceptable. If the parity is odd then the output of Flip-Flop 60 at the end of the 32 bit word is a logic "one." This signal is applied to Data Validation Circuit 23 which remembers the output state of the Parity Detection Network and the output of the 32 Bit Counter from the Data Clocking Path. In other words, if the parity is coreect and 32 data bits have been received in sequence, this is an indication that the data is valid and a signal is generated at the output of the network indicating that this is, in fact, so. If, on the other hand, the parity is not odd or if 32 data bits have not been received, then the output of this network indicates a data invalid condition.

DATA VALIDATION CIRCUIT

Data Validation Circuit 23 includes a logic gate 62, one input of which is connected to Parity Flip-Flop 60 and the other input of which is connected to the output of 32 Bit Counter 53. If the output from Parity Flip-Flop 60 is at a logic "one" indicating odd parity, one input to logic gate 62 is high and if 32 data bits have been counted, the output of Bit Counter 53 goes high. Both inputs to logic gate 62 are, therefore, high and as a result, the output of Gate 62 which is applied to a Data Valid Flip-Flop 63 goes to a logic "one" level. The output of gate 62 is applied directly to the J terminal to Flip-Flop 63 and to the K terminal through an inverting amplifier 64. The output of Synch Gate Flip-Flop 46 which is the enabling signal for the Data Clocking Path is applied to the clock terminal of Flip-Flop 63 over lead 65. Thus, if the output of gate 62 goes to the logic "one" level the J and K terminals of Data Valid Flip-Flop 63 are respectively at the "one" and the "zero" level. When the enabling signal from Synch Gate Flip-Flop 46 terminates, the negative going edge of the enabling signal shifts the output of Data Valid Flip-Flop 63 to a logic "one" level indicating a Data Valid condition, i.e., parity is correct and 32 bits have been counted. If, on the other hand, either the parity is incorrect or 32 data bits have not been received by the time the enabling signal is terminated, (i.e., an Error pulse has been received, for example), the output from the 32 Bit Counter 53 or from Parity Flip-Flop 60 is at the logic "zero" level. The output of logic gate 62 remains at the low or logic "zero" level so that the J and K terminals of Data Valid Flip-Flop are respectively at the "zero" and "one" level. Termination of the enabling signal which applies a negative clock pulse to the clock terminal of Flip-Flop 63 now switches Flp-Flop 63 to a logic "zero" state indicating a Data Invalid condition.

Whenever the enabling pulse from Synch Gate Flip-Flop 46 is terminated, whether due to the fact that the full 32 data bit message has been received or because an error condition has been detected, the output of the Q terminal of Synch Gate Flip-Flop 46 goes from the logic "zero" to the logic "one" level. This logic "one" signal is applied along with a clock pulse to logic gate 70 in Reset Circuit 48. Gate 70 has its output connected to the reset terminal of Parity Flip-Flop 60 and through an Inverting Amplifier 71 to the reset terminal of Bit Counter 53. Thus, when the enabling signal is terminated, a delayed reset signal is generated at the output of Logic Gate 70 which resets Bit Counter 53 and Parity Checking Flip-Flop 60. The Q terminal of Flip-Flop 60 is reset to the low or logic "zero" state so that the Flip-Flop is ready to provide an indication of the data parity of subsequent message.

In summary, it can be seen that a data receiver arrangement has been provided in which the period of the received bits is utilized as the processing discriminant in that the time interval between successive data bits is determined and compared to predetermined interval values to sense whether a proper data or synchronizing bit has been received or whether a transmission error has occurred which invalidates the data. As a result, errors due to variations of the rise and fall times associated with the transmitted digital bits is minimized and the receiver operation effectively becomes independent of the rise and fall times associated with incoming signal. Furthermore, the ability of the receiver to detect invalid data due to transmission errors, greatly increases the accuracy and credibility of the output data.

While a particular embodiment of this invention has been shown and described, it will, of course, be understood that the invention is not limited thereto since many modifications thereof may be made. It is contemplated by the appended claims to cover any such modifications which fall within the true spirit and scope of this invention.

What is claimed as new and desired to be secured by Letters Patent of the United States is:

1. In a data receiver for decoding digital data, the combination comprising,
    a. means to extract the data from the received digital signal which includes a plurality of synchronizing and data bits,
    b. a data storage means for storing received data,
    c. Bit Period Timer means for determining from the bit period whether each received bit is a data or synchronizing bit or whether a transmission error has occurred including,
        1. means for measuring the time interval between successive pulses of each received bit,
        2. means for comparing the measured interval with predetermined intervals associated with data and synchronizing bits to produce data and synchronizing pulses if the measured intervals are the same as the predetermined intervals,
    d. A Data Clocking Path associated with said Data Storage means for clocking received data from said data extraction means into said register, and,
    e. means for coupling Data Pulses from said Bit Period Timer means to said Data Clocking Path as enabling pulses for said clocking path to permit clocking of data into said register only if the received bit period as determined by the Bit Period Timer indicates a valid data bit has been received.

2. The data receiver according to claim 1 wherein said Bit Period Timer means includes a shift register having clock pulses shifted down the register, means for resetting said register in response to successive pulses of each reset bit, logic means coupled tp to the output of said shift register to measure the count entered into said register during each interval to determine whether the interval represents a data, synchronizing or error bit and to produce output pulses for these various bits.

3. The data receiver according to claim 1 further including a synchronizing pulse counter network including means to produce an output signal if a predetermined number of synchronizing pulses are received from the Bit Period Timer indicating that the proper number of synchronizing bits associated with a valid message have been received, and means to couple the output signal from said Synchronizing Pulse Counter Network to said Data Clocking Path so that said Clocking Path is enabled to clock data in response to the data pulses only if the Synchronizing Pulse Counter Network indicates that the proper number of synchronizing bits have been received.

4. The data receiver according to claim 1 wherein said incoming digital signal is in the bi-polar format and the said Bit Period Timer measures the interval between successive pulses to determine the half bit period of each bi-polar bit.

5. The data receiver according to claim 4 including means to convert the bi-polar bits into a positive pulse train having one pulse for each pulse in the bi-polar bit whereby the frequency of said pulse train is twice the bit frequency, detector means to produce edge pulse trains in response to each departure of the double frequency pulses in positive and negative going directions, a shift register having clock pulses shifted down the register, means coupling one of said edge pulse trains to the reset terminal of said shift register to reset said register in response to successive pulses in one of said edge pulse trains, logic means coupled to said shift register and actuated in response to each pulse in said edge pulse train to measure the count entered into said shift register during each interval, and means to generate Data, Synchronizing or Error pulses based on the elapsed interval, said measurement of said count taking place during the second half of each bi-polar bit so that data is entered during the second half bit time.

6. The data receiver according to claim 5 wherein the Data Clocking Path includes a Flip-Flop which is enabled from said Synchronizing Pulse Counter Network to switch states for successive clock pulses, means for coupling data pulses from said Bit Interval Timer as clock pulses to said Flip-Flop, clock pulse gating means coupled to the output of said Flip-Flop and said edge detector means, said clock pulse gating producing an output clocking pulse for said Data Register during the second half of each bi-polar data bit so that data is entered during the second half bit time.

* * * * *